Jan. 3, 1967  G. W. RUSLER, JR  3,296,422
APPARATUS FOR COMPUTING TRUE VERTICAL POSITION, VELOCITY
AND ACCELERATION FOR AIRCRAFT
Filed Feb. 12, 1962  5 Sheets-Sheet 1

INVENTOR.
GEORGE W. RUSLER, JR.

BY

ATTORNEY.

Jan. 3, 1967 G. W. RUSLER, JR 3,296,422
APPARATUS FOR COMPUTING TRUE VERTICAL POSITION, VELOCITY
AND ACCELERATION FOR AIRCRAFT
Filed Feb. 12, 1962

INVENTOR.
GEORGE W. RUSLER, JR.

INVENTOR.
GEORGE W. RUSLER, JR.

BY

ATTORNEY.

INVENTOR.
GEORGE W. RUSLER, JR
BY Gordon Reed

ATTORNEY.

United States Patent Office 3,296,422
Patented Jan. 3, 1967

3,296,422
APPARATUS FOR COMPUTING TRUE VERTICAL POSITION, VELOCITY AND ACCELERATION FOR AIRCRAFT
George W. Rusler, Jr., Minneapolis, Minn., assignor to Honeywell Inc., a corporation of Delaware
Filed Feb. 12, 1962, Ser. No. 172,591
20 Claims. (Cl. 235—150.25)

This invention relates to acceleration and velocity measuring and indicating apparatus or systems and more particularly to vertical acceleration and vertical velocity measuring and indicating systems. The arrangement has its application in dirigible crafts such as aircraft or submarines and supplies voltages of true vertical position, vertical acceleration, and vertical velocity and a display of these latter two quantities.

It may appear that to obtain the vertical velocity and vertical acceleration of the dirigible craft, would simply require differentiating an altitude displacement signal for aircraft or a pressure depth displacement signal for submarine to thus yield velocity and acceleration signals of equal quality. Actually, this is not so since each differentiation say of a D.C. signal increases the percentage noise content of the signal, and there is no way to attenuate this noise without affecting the desired information as well.

It is an object of this invention to provide true velocity and acceleration signals and provide indications of their magnitudes in a novel apparatus which indications may be used to control a craft.

It is a further object of this invention to provide vertical position, vertical acceleration and/or vertical velocity signals in arrangements which attenuate the noise component of such signals, such arrangements utilizing lag devices and/or differentiating devices.

It is a further object of this invention to provide an arrangement for providing vertical acceleration and vertical velocity signals wherein the error component as that due to noise is attenuated by first and second-order lags in velocity and acceleration respectively and wherein the true vertical acceleration and true vertical signals are passed completely without attenuation.

The above and other objects of the invention will appear on reference to embodiments of the invention to be described, in conjunction with the accompanying drawing in which are shown in schematic form the novel apparatus including an arrangement of the lag and differentiating devices.

In the drawings, FIGURE 1 shows a flow diagram by which algebraic expressions for the true vertical acceleration, true or correct vertical velocity and vertical position are obtained;

Figure 1:
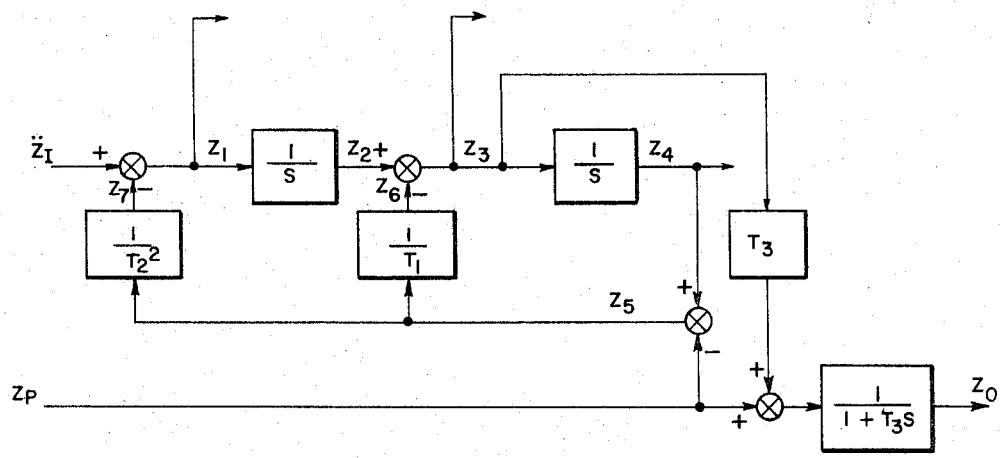

In this apparatus or system, vertical acceleration along with gravity acceleration are sensed by a suitable accelerometer such as a precision pendulous floated accelerometer which may be mounted in a two gimbal repeater slaved to pitch and roll information on the craft which as stated may be an aircraft or submarine. A computer in the form illustrated in FIGURE 1 is utilized which employs two integrators. This computer blends the signals from the above acceleration sensing device and from a position sensor which for submarines may be a pressure depth sensor or in aircraft may be an altimeter and whereby the computer yields a true vertical position signal, a true acceleration signal, and a true vertical velocity signal. Concerning its application to submarines, no calibration for submarine depth or position is necessary for the proper compensation of the gravity term. The indicator not only furnishes the desired display of acceleration and velocity but, if desired, the analog voltages of position, acceleration, and velocity may be used by the submarine depth control system.

The method of computing true vertical acceleration, true vertical velocity from information contained in a generally vertically aligned accelerometer can be divided into two major categories:

(1) Extracting true acceleration from the accelerometer output
(2) Integrating this signal to obtain velocity with a bounded error or an error limited in magnitude. Such bounded error may, for example, be due to noise in the sensed signal but is noncumulative due to the present method of computation.

The method of integration or computation utilized may be considered by reference to FIGURE 1 in conjunction with which mathematic expressions for blended vertical acceleration and blended vertical velocity are obtained.

By referring to FIGURE 1 and the reference characters thereon the following mathematic relationships are clear.

Firstly, there are two given quantities or sensed quantities and from these the true vertical acceleration and vertical velocity and vertical position are obtained. The given quantities are $\ddot{Z}_I$ which is the indicated vertical acceleration, and $Z_P$ which, in the submarine, is the pressure depth but which, for aircraft, may be the altitude from a datum.

As a preliminary, since as evident from the summing step in FIGURE 1 that an acceleration term will be combined with a displacement term, it will be necessary in order to properly effect such summing to bring the displacement term to the same order dimensionally as the acceleration term.

Proceeding with FIGURE 1, arbitrary symbols $Z_1$, $Z_2$, $Z_3$, $Z_4$ and $Z_5$ are used to designate the indicated data at various points within the computer.

The operation of integration with respect to time is indicated by use of the inverse mathematical operator, $1/S$. Similarly, in the mathematical derivation that follows, the operation of differentiation with respect to time is indicated by the mathematical operator S. The symbol within any block operates upon the data entering the block as follows:

$Z_2 = (1/S)Z_1$      $Z_4 = (1/S)Z_3$
$Z_6 = (1/T_1)Z_5$      $Z_7 = (1/T_2^2)Z_5$

The symbols $1/T_1$ and $1/T_2^2$ are arbitrary symbols representing gain factors chosen to achieve the desired relationships between the errors, or noise, in the sensed quantities and in the output quantities.

The relationships indicated in FIGURE 1 are then:

$$Z_1 = \ddot{Z}_I - Z_7 \tag{1}$$
$$Z_2 = (1/S)Z_1 \tag{2}$$
$$Z_3 = Z_2 - Z_6 \tag{3}$$
$$Z_4 = (1/S)Z_3 \tag{4}$$
$$Z_5 = Z_4 - Z_p \tag{5}$$
$$Z_6 = (1/T_1)Z_5 \tag{6}$$
$$Z_7 = (1/T_2^2)Z_5 \tag{7}$$

Substituting (5) into (6) and (7)

$$Z_6 = 1/T_1(Z_4 - Z_p) \quad (8)$$
$$Z_7 = 1/T_2^2(Z_4 - Z_p) \quad (9)$$

Substituting (9) into (1)

$$Z_1 = \ddot{Z}_I - (1/T_2^2)(Z_4 - Z_p) \quad (10)$$

Substituting (10) into (2)

$$Z_2 = 1/S[\ddot{Z}_I - (1/T_2^2)(Z_4 - Z_p)] \quad (11)$$

Substituting (11) and (8) into (3)

$$Z_3 = 1/S[\ddot{Z}_I - (1/T_2^2)(Z_4 - Z_p)] - 1/T_1(Z_4 - Z_p) \quad (12)$$

Substituting (12) into (4)

$$Z_4 = 1/S^2[\ddot{Z}_I - (1/T_2^2)(Z_4 - Z_p)] - (1/ST_1)(Z_4 - Z_p) \quad (13)$$

Collecting all $Z_4$ terms on the left and collecting the $Z_p$ terms on the right $$Z_4(1 + (1/ST_1) + (1/S^2T_2^2)) = (1/S^2)\ddot{Z}_I + ((1/ST_1) + (1/S^2T_2^2))Z_p \quad (14)$$

Multiplying both sides by $S^2T_2^2$ $$Z_4(1 + S(T_2^2/T_1) + S^2T_2^2) = T_2^2\ddot{Z}_I + (1 + S(T_2^2/T_1))Z_p \quad (15)$$

Dividing both sides by $(1 + ST_2^2/T_1) + S^2T_2^2)$ $$Z_4 = \frac{T_2^2}{1 + S\frac{T_2^2}{T_1} + S^2T_2^2}\ddot{Z}_I + \frac{1 + S\left(\frac{T_2^2}{T_1}\right)}{1 + S\frac{T_2^2}{T_1} + S^2T_2^2}Z_p \quad (16)$$

Now if the sensed vertical acceleration, $\ddot{Z}_I$, is considered as a composite of the true vertical acceleration, or second derivative of the true displacement $S^2Z$, plus an error or noise, $\delta_I$, then $$\ddot{Z}_I = S^2Z + \delta_I \quad (17)$$

Similarly, if the sensed vertical position $Z_p$, is considered as a composite of the true vertical position, Z, plus an error or noise $\delta_p$, then $$Z_p = Z + \delta_p \quad (18)$$

Substituting (17) and (18) into (16)

$$Z_4 = \frac{T_2^2}{1 + S\left(\frac{T_2^2}{T_1}\right) + S^2T_2^2}S^2Z + \frac{T_2^2}{1 + S\left(\frac{T_2^2}{T_1}\right) + S^2T_2^2}\delta_I$$
$$+ \frac{1 + S\left(\frac{T_2^2}{T_1}\right)}{1 + S\frac{T_2^2}{T_1} + S^2T_2^2}Z + \frac{1 + S\left(\frac{T_2^2}{T_1}\right)}{1 + S\frac{T_2^2}{T_1} + S^2T_2^2}\delta_p \quad (19)$$

Collecting the Z terms $$Z_4 = \frac{1 + S\left(\frac{T_2^2}{T_1}\right) + S^2T_2^2}{1 + S\frac{T_2^2}{T_1} + S^2T_2^2}Z$$
$$+ \frac{T_2^2}{1 + S\frac{T_2^2}{T_1} + S^2T_2^2}\delta_I + \frac{1 + S\left(\frac{T_2^2}{T_1}\right)}{1 + S\frac{T_2^2}{T_1} + S^2T_2^2}\delta_p$$

or $$Z_4 = Z + \frac{T_2^2}{1 + S\frac{T_2^2}{T_1} + S^2T_2^2}\delta_I + \frac{1 + S\left(\frac{T_2^2}{T_1}\right)}{1 + S\frac{T_2^2}{T_1} + S^2T_2^2}\delta_p \quad (20)$$

Thus the computed vertical position, $Z_4$, is composed of the true vertical position, Z, plus error terms containing modifications of $\delta_I$ and $\delta_p$. The character of these error terms may be observed if the mathematical operator equivalent to S, namely, $jw$, is used, and the substitutions are made of $1/W_n^2$ for $T_2^2$ and $\zeta$ for $T_2/2T_1$. Then $T_2^2/T_1$ becomes $2\zeta/W_n$ and $T_1$ becomes $1/2\zeta W_n$, wherein $W_n$ = natural frequency of the system and zeta ($\zeta$) is the system damping ratio. Noting that $j = \sqrt{-1}$, $j^2 = -1$. Making these substitutions in the denominator of the factors of $\delta_I$ and $\delta_p$ $$\frac{1}{1 + S\frac{T_2^2}{T_1} + S^2T_2^2} = \frac{1}{1 + 2\vartheta\frac{jw}{W_n} - \frac{w^2}{W_n^2}}$$

Whence it can be seen that this denominator represents the transfer function as a function of the frequency, $w$, for a second order system of which $W_n$ is the natural frequency and $\vartheta$ is the damping ratio.

Making the above substitutions into (20)

$$Z_4 = Z + \delta_4 = Z + \frac{\frac{1}{W_n^2}}{1 + 2\zeta\frac{jw}{W_n} - \frac{w^2}{W_n^2}}\delta_I + \frac{1 + 2\vartheta\frac{jw}{W_n}}{1 + 2\vartheta\frac{jw}{W_n} - \frac{w^2}{W_n^2}}\delta_p \quad (21)$$

Thus $$\delta_4 = \frac{\frac{1}{W_n^2}}{1 + 2\vartheta\frac{jw}{W_n} - \frac{w^2}{W_n^2}}\delta_I + \frac{1 + 2\vartheta\frac{jw}{W_n}}{1 + 2\vartheta\frac{jw}{W_n} - \frac{w^2}{W_n^2}}\delta_p \quad (22)$$

where $\delta_4$ is the error or noise in $Z_4$.

Thus at low frequencies, i.e., for $W^2W_n^2 \ll 1$, the error contribution of $\delta_I$ to $\delta_4$ is multiplied by the factor $1/W_n^2$.

For these frequencies the error contribution of $\delta_p$ to $\delta_4$ is not modified. At high frequencies i.e., for $W^2/W_n^2 \gg 1$, the error contribution of $\delta_I$ to $\delta_4$ is attenuated at 12 db per octave as the frequency increases. For these frequencies, the error contribution of $\delta_p$ to $\delta_4$ is attenuated at 6 db per octave as the frequency increases, for such method see for example chapter 12, Thaler & Brown Servomechanism Analysis, First edition 1953.

At medium frequencies, i.e. for $w^2/W_n^2 \approx 1$, the error contribution of $\delta_I$ to $\delta_4$ will be largely determined by the factor $(1/2\vartheta jW_n)$. For these frequencies, the error contribution of $\delta_p$ to $\delta 4$ will be largely determined by the factor $(1 + 2\vartheta j)/(2\vartheta j)$. If it is not acceptable for a steady state error in $\delta_I$ to be transmitted into the computed position, then the part of the computer enclosed in dashed lines may be added and the computed position may be taken from $Z_0$.

In order to find the corresponding relationships for the computed vertical velocity, $Z_3$, (20) is substituted into (4).

$$SZ + \delta_3 = Z_3$$

Reverting to FIGURE 1, $Z_3 = SZ_4$ and from (20)

$$Z_3 = SZ + \frac{ST_2^2}{1 + S\frac{T_2^2}{T_1} + S^2T_2^2}\delta_I + \frac{S\left[1 + S\left(\frac{T_2^2}{T_1}\right)\right]}{1 + S\frac{T_2^2}{T_1} + S^2T_2^2}\delta_p \quad (23)$$

Where $\delta_3$ is the error or noise in the computed vertical velocity, $Z_3$, and $SZ$ is the true vertical velocity, or first derivative of true position.

By substitutions as were used in (21)

$$Z_3 = SZ + \delta_3 = SZ + \frac{\frac{jw}{W_n^2}}{1 + 2\vartheta\frac{jw}{W_n} - \frac{w_2}{W_n^2}}\delta_I + \frac{jw\left(1 + 2\vartheta\frac{jw}{W_n}\right)}{1 + 2\vartheta\frac{jw}{W_n} - \frac{w^2}{W_n^2}}\delta_p \quad (24)$$

Thus $$\delta_3 = \frac{\frac{jw}{W_n^2}}{1 + 2\vartheta\frac{jw}{W_n} - \frac{w^2}{W_n^2}}\delta_I + \frac{jw\left(1 + 2\vartheta\frac{jw}{W_n}\right)}{1 + 3\vartheta\frac{jw}{W_n} - \frac{w^2}{W_n^2}}\delta_p \quad (25)$$

Thus at zero frequency, $w=0$, there is no error contribution, $\delta_3$, to the computed vertical velocity, $Z_3$, from $\delta_I$ or $\delta_p$. Also, for low frequencies, $(w^2/W_n^2) \ll 1$, the error contribution of $\delta_I$ and $\delta_p$ to $\delta_3$ is correspondingly low, having been attenuated at 6 db per octave as the frequency decreased. As a consequence, there is no error in the computed vertical velocity from such essentially steady-state errors in the sensed vertical acceleration and position as:

(1) Improper compensation for the gravitational attraction sensed by the accelerometer.

(2) Long term drifts or shifts in the zero reference of either the accelerometer or the position sensor.

(3) Long term drifts in the acceleration-to-velocity integrator (which can be considered equivalent to an error like $\delta_I$).

(4) Improper initial conditions for the acceleration-to-velocity integration.

At high frequencies, $(w^2/W_n^2) \gg 1$, the error contribution of $\delta_I$ to $\delta_3$ is attenuated at 6 db per octave as the frequency increases. For these frequencies, the error contribution of $\delta_p$ to $\delta_3$ approaches a value determined by the factor $2\vartheta$.

At medium frequencies, $(w^2/W_n^2) \approx 1$, the error contribution of $\delta_I$ to $\delta_3$ is largely determined by the factor $1/2\vartheta W_n$. For these same frequencies, the error contribution of $\delta_p$ to $\delta_3$ is largely determined by the factor $$(w^2/2\vartheta)(1+2\vartheta j)$$

The relationships for the computed vertical acceleration, $Z_1$ are obtained by substituting (20) and (18) into (10).

$$Z_1 = S^2Z + \delta_I - \frac{1}{T_2^2}\left[ Z + \frac{T_2^2}{1+S\frac{T_2^2}{T_1}+S^2T_2^2}\delta_I + \frac{1+S\frac{T_2^2}{T_1}}{1+S\frac{T_2^2}{T_1}+S^2T_2^2}\delta_p - Z - \delta_p \right] \quad (26)$$

Collecting the terms in $\delta_I$ and in $\delta_p$, $$Z_1 = S^2Z + \left( -\frac{1}{1+S\frac{T_2^2}{T_1}+S^2T_2^2} \right)\delta_I + \frac{1}{T_2^2}\left( 1 - \frac{1+S\frac{T_2^2}{T_1}}{1+S\frac{T_2^2}{T_1}+S^2T_2^2} \right)\delta_p \quad (27)$$

Rearranging the factors, $$Z_1 = S^2Z + \delta_1 = S^2Z + \frac{S\frac{T_2^2}{T_1}(1+ST_1)}{1+S\frac{T_2^2}{T_1}+S^2T_2^2}\delta_I + \frac{S^2}{1+S\frac{T_2^2}{T_1}+S^2T_2^2}\delta_p \quad (28)$$

where $\delta_1$ is the error or noise in the computed vertical acceleration, $Z_1$, and $S^2Z$ is the second derivative of true vertical position. This $S^2Z$ may be considered as true vertical acceleration that relates position to time without consideration having to be made of gravitational effects.

By substitutions as were used in (21)

$$Z_1 = S^2Z = \delta_1 = S^2Z + \frac{2\vartheta\frac{jw}{W_n}\left(1+\frac{1}{2\vartheta}\frac{jw}{W_n}\right)}{1+2\vartheta\frac{jw}{W_n}-\frac{w^2}{W_n^2}}\delta_I - \frac{w^2}{1+2\vartheta\frac{jw}{W_n}-\frac{w^2}{W_n^2}}\delta_p \quad (29)$$

Thus $$\delta_1 = \frac{2\vartheta\frac{jw}{W_n}\left(1+\frac{1}{2\vartheta}\frac{jw}{W_n}\right)}{1+2\vartheta\frac{jw}{W_n}-\frac{w^2}{W_n^2}}\delta_I - \frac{w^2}{1+2\vartheta\frac{jw}{W_n}-\frac{w^2}{W_n^2}}\delta_p \quad (30)$$

Thus at zero frequency, $w=O$, there is no error contribution, $\delta_1$, to the computed vertical acceleration, $Z_1$, from either $\delta_I$ or $\delta_p$. Also, for low frequencies, $$w^2/W_n^2 \ll 1$$

the error contribution of $\delta_I$ and $\delta_p$ to $\delta_1$ is correspondingly low, having been attenuated at 6 db and 12 db per octave, respectively, as the frequency decreased. As a consequence, there is no error in the computed vertical acceleration from such essentially steady-state errors in the sensed vertical acceleration and position as:

(1) Improper compensation for the gravitational attraction sensed by the accelerometer.

(2) Long term drifts or shifts in the zero reference of either the accelerometer or the position sensor.

At high frequencies, $w^2/W_n^2 \gg 1$, the error contribution of $\delta_I$ to $\delta_1$ approaches unity. For these frequencies, the error contribution of $\delta_p$ to $\delta_1$ approaches a value determined by the factor $W_n^2$.

At medium frequencies, $w^2/W_n^2 \approx 1$, the error contribution of $\delta_I$ to $\delta_1$ is largely determined by the factor $(1+j/2\vartheta)$. For these same frequencies the error contribution of $\delta_p$ to $\delta_1$ is largely determined by the factor $jW_n^2/2\vartheta$.

From the foregoing error discussion, it will be readily apparent that knowledge of the error spectrum of the sensed position, $Z_p$, and acceleration $\ddot{Z}_I$, signals will enable selection to be made of the natural frequency, $W_n$, and damping ratio, $\vartheta$, for the blending network which will minimize the errors in the computed position, $Z_4$, velocity $Z_3$, and acceleration, $Z_1$, throughout the frequency range of interest.

By comparison with the sole use of the sensed position signal, $Z_p$, for position information, the blending method permits the high frequency errors to be attenuated without greatly increasing the low frequency errors. The same comparison applies between the sole use of the differentiation of the sensed position signal, $Z_p$, for velocity information, and the blending method. The use of the integration of the sensed acceleration signal, $\ddot{Z}_I$, for velocity information would yield velocity errors that would increase with time without limit. The blending method bounds the velocity error and provides correct initial conditions for the acceleration-to-velocity integration.

By comparison with the sole use of the sensed acceleration signal, $\ddot{Z}_I$, for acceleration information, the blending method completely eliminates steady-state errors and attenuates low frequency errors without greatly increasing high frequency errors.

It will be apparent to those skilled in the art that additional freedom in the control of the frequency distribution of the error contributions from the sensed position, $Z_p$, and accelerating $\ddot{Z}_I$, into the computed position, $Z_4$, velocity $Z_3$, and acceleration, $Z_1$, may be obtained by use of suitable electrical filter networks in place of constant gain factors, $1/T_1$ and $1/T_2^2$. The usual constraints dictated by stability of the closed loops will govern the freedom of choice for such filter networks.

Figure 2:
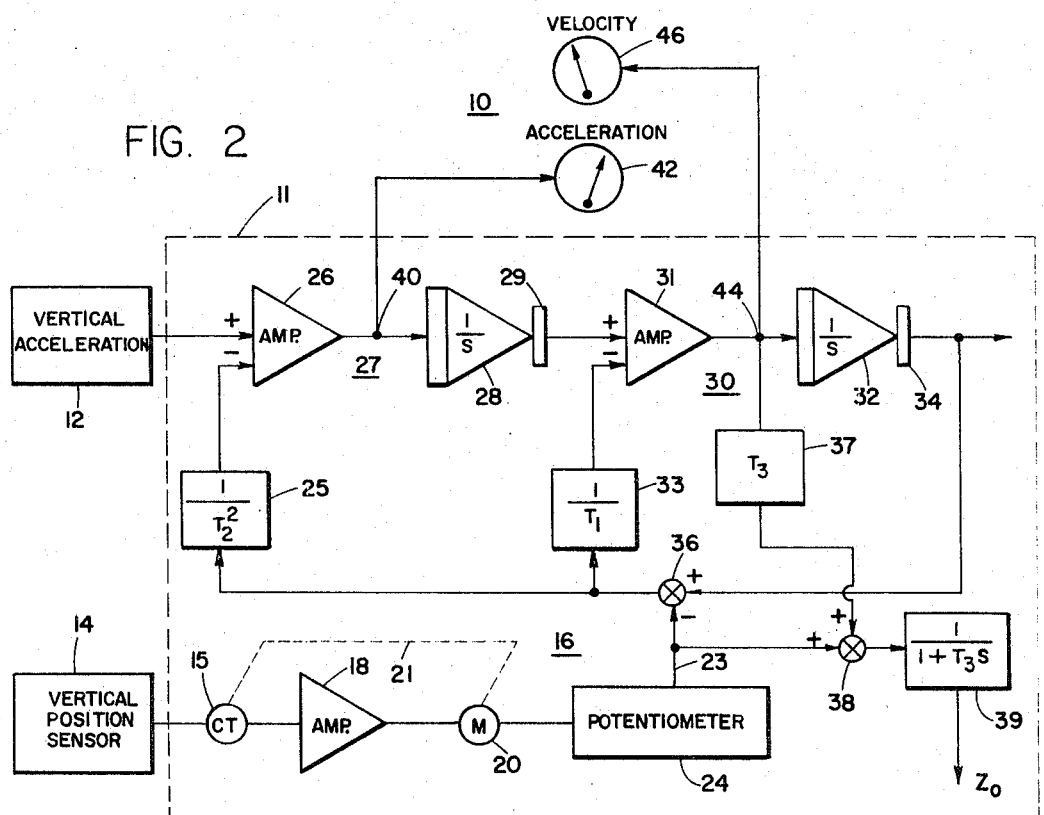
FIGURE 2 shows the electrical-block schematic embodiment of the computing arrangement of FIGURE 1 for obtaining vertical position, vertical acceleration and vertical velocity.

Having discussed the principles of the invention a system embodiment or mechanization of FIGURE 2 will be considered the components whereof are old. This system comprises an indicator arrangement 10, a computer 11, a vertical accelerometer 12 for providing vertical acceleration signals $\ddot{Z}_I$, and a vertical position sensor 14 such as a depth sensor for submarine type vessels or an altimeter for airborne craft providing signal $Z_p$. The accelerometer 12 senses vertical accelerations and is responsive to gravity and aceleration perturbations from which is derived an error signal voltage which in the present embodiment may be derived from a potentiometer or other signal voltage providing device.

The device 14 for sensing altitude or depth also provides an error signal voltage. In the present embodiment the depth-error signal is supplied through the operation of a control transformer 15 in the computer 11 and this signal is furnished to a servo repeater 16 comprising an amplifier 18, a followup electric motor 20 operatively connected to the control transformer by driving means 21. The motor 20 also operates an output potentiometer 24 supplying the depth-error signal or vertical position signal for computer 11. This repeating of the depth-error signal thus is performed by the familiar servo loop configuration incorporating the synchro control transformer 15, the amplifier 18, the motor and gear train 20, the mechanical feedback 21 to the synchro control transformer 15 as in Perkins application SN. 533,131, of December 14, 1955, now Patent No. 3,222,493.

The output of potentiometer 24 is supplied through transmission means 23 to a gain device 25 having a transfer function $1/T_2^2$ wherein $T_2$ represents the constant previously described. The output of device 25 along with the signal from accelerometer 12 is algebraically combined in the summing amplifier 26. Amplifier 26 comprises part of an integrator 27 which additionally includes a conventional motor integrator 28. The integrator 27 will accept D.C. input signals and drives the output shaft of motor 28 and potentiometer 29 at a rate proportional to the magnitude of the sum of various input signals. This first integrator 27 thus obtains or provides to potentiometer 29 a velocity derived from a sensed acceleration.

The computer 11 also includes a second integrator 30 comprising summing amplifier 31 and motor 32. The output from the vertical position potentiometer 24 is applied to a second gain factor device 33 having a transfer function $1/T_1$ from which it is applied to summing amplifier 31 to be combined with the electrical output from integrator motor operated potentiometer 29. The output from amplifier 31 controls the integrator motor 32 which in turn supplies an electrical output, by means of a potentiometer 34. The signal from potentiometer device 34 is applied in a feedback arrangement to summing device 36.

The output of the amplifier 31 in addition to operating indicator 46 also supplies an electrical signal to a fourth gain device 37 having the transfer function $T_3$ which in turn is connected in additive manner at summing device 38 to the second input from conductor 23. The output from summing device 38 is applied to lag device 39 having the output $Z_0$.

Outputs from computer 11 which are D.C. voltages define the vertical acceleration and vertical velocity of the craft or missile and they are respectively obtained from points 40, 44. The vertical acceleration at terminal 40 is supplied to utilization means such as an indicator 42 having suitable indicia, and the vertical velocity obtained at terminal 44 is applied to an indicator 46 also having suitable indicia. The D.C. signals on terminals 40 and 44 are termed blended vertical acceleration and blended velocity respectively.

Determination of vertical velocity conventionally through inertial means only, amounts to open loop integration of acceleration. Regardless of how accurately acceleration is measured (and subsequently integrated), the error in velocity is divergent or unbounded. Even assuming a perfect integrator, if an acceleration signal with an uncertainty of $10^{-5}$ G's is assumed, the velocity error would exceed the desirable magnitude of error in slightly more than 30 seconds. Obviously therefore pure inertial determination of vertical velocity by open loop integration acceleration would not meet accuracy requirements. It has also been stated that differentiation of the displacement signal is undesirable and unacceptable. Therefore when measurement or computation of true vertical velocity and acceleration are accomplished inertially, a mechanism must constrain such velocity error which is the function of the vertical displacement sensor 14. While in the present arrangement the vertical position signal is provided by a depth or pressure responsive sensor, such signal may be also derived from an optical device, radar, sonar or any other means.

Figure 3:
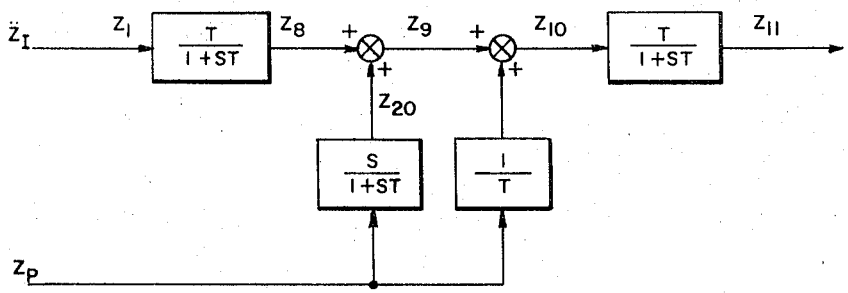
FIGURES 3–8 show other forms of the invention using lead and lag devices.
Figure 4:
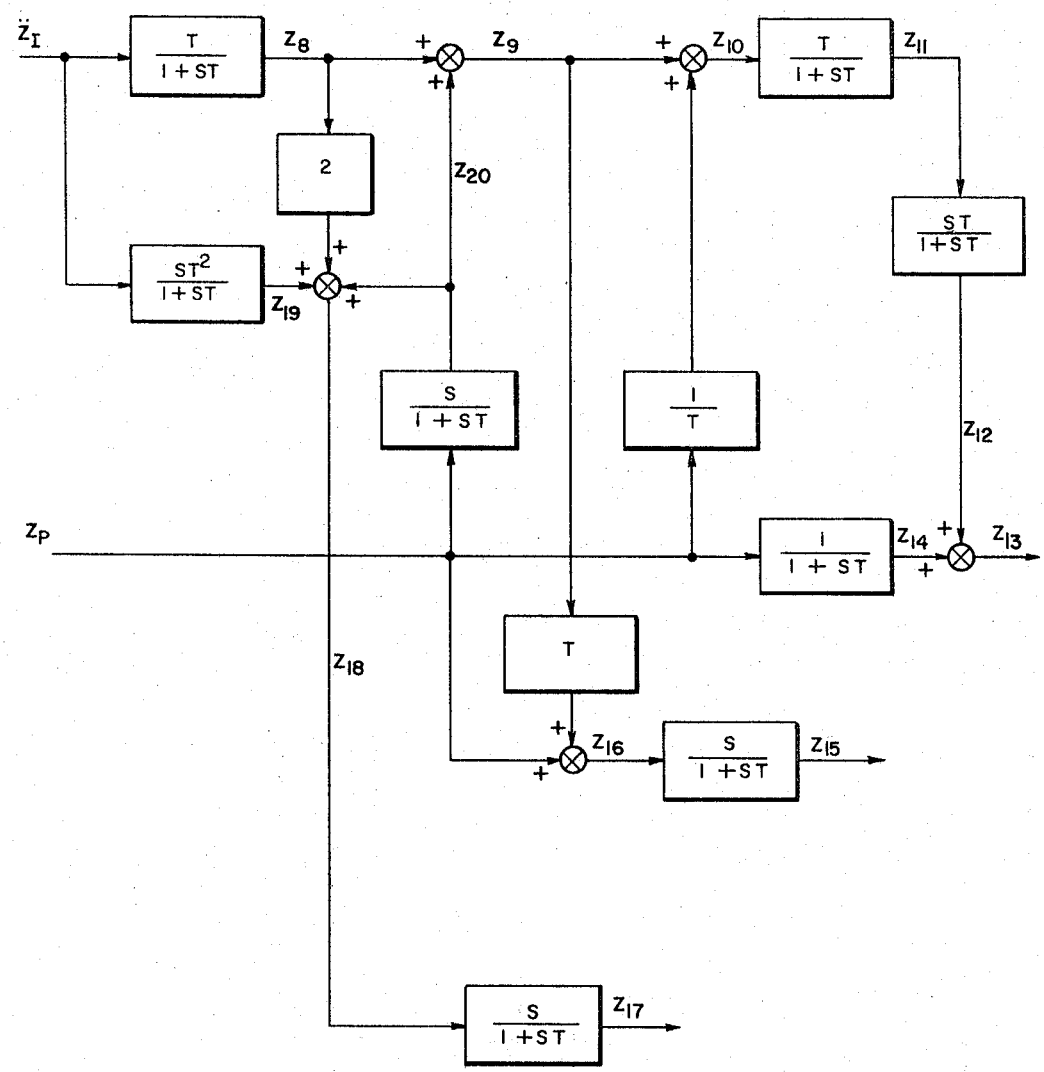

An alternative means for utilizing position and acceleration data in synthesizing position, velocity and acceleration data containing the best information content from the original data may be considered by reference to FIGURES 3 and 4. Both versions utilize simple hi-pass and lag networks instead of integrators, as used in FIGURE 1. The simpler version, shown in FIGURE 3, is suitable for applications in which it is tolerable for a steady-state, though bounded, error to exist in the computer acceleration, velocity, and position data as a result of a steady-state error in the sensed acceleration. A bounded error is of the type due to noise but is noncumulative with time. Also there are other factors beside noise that may cause a bounded error. Through a mathematical development similar to the preceding, it can be shown that:

$$\ddot{Z}_I = S^2 Z + \delta_1 \quad (17)$$

$$\ddot{Z}_I = S^2 Z + \delta_1 = Z_1$$

$$\delta_1 = \delta_I \quad (31)$$

$$Z_p = Z + \delta_p \quad (18)$$

$$Z_9 = SZ + (T/1+ST)\delta_I + (S/1+ST)\delta_p = SZ + \delta_9 \quad (32)$$

$$\delta_9 = (T/1+ST)\delta_I + (S/1+ST)\delta_p \quad (33)$$

$$Z_{11} = Z + (T^2/(1+ST)^2)\delta_I + ((1+2ST)/(1+ST)^2)\delta_p = Z + \delta_{11} \quad (34)$$

$$\delta_{11} = (T^2/(1+ST)^2)\delta_I + ((1+2ST)/(1+ST)^2)\delta_p \quad (35)$$

Thus, the computed acceleration $\ddot{Z}_I$, the computed velocity $Z_9$, and the computed position $Z_{11}$, each contain a steady state, but limited, error from a steady state error in the sensed acceleration, $\ddot{Z}_I$. At the same time, the contribution of the higher frequency errors in the sensed position, $Z_p$, to the computed velocity $Z_9$, is limited by the factor $1/T$. Thus such error is considerably reduced below that which would result by direct differentiation of the position data. The contribution of the higher frequency errors in the sensed position $Z_p$, to the computed position $Z_{11}$, is attenuated at 6 db per octave as the frequency increases.

When there must be no error in the computed acceleration, velocity and position from a steady state error in the sensed acceleration, the means shown in FIGURE 4 may be used. Through a mathematical development similar to that previously used, it can be shown that:

$$\ddot{Z}_I = S^2 Z + \delta_I \quad (17)$$

$$Z_p = Z + \delta_p \quad (18)$$

$$Z_{17} = S^2 Z + \frac{ST(2+ST)}{(1+ST)^2}\delta_I + \frac{S^2}{(1+ST)^2}\delta_p = S^2 Z + \delta_{17} \quad (36)$$

$$\delta_{17} = \frac{ST(2+ST)}{(1+ST)^2}\delta_I + \frac{S^2}{(1+ST)^2}\delta_p \quad (37)$$

$$Z_{15} = SZ + \frac{ST^2}{(1+ST)^2}\delta_I + \left[\frac{S^2 T}{(1+ST)^2} + \frac{S}{1+ST}\right]\delta_p = SZ + \delta_{15} \quad (38)$$

$$\delta_{15} = \frac{ST^2}{(1+ST)^2}\delta_I + \left[\frac{S^2 T}{(1+ST)^2} + \frac{S}{1+ST}\right]\delta_p \quad (39)$$

$$Z_{13} = Z + \frac{ST^3}{(1+ST)^3}\delta_{\mathrm{I}} + \frac{1+3ST+3S^2T^2}{(1+ST)^3}\delta_{\mathrm{p}} = Z + \delta_{13} \quad (40)$$

$$\delta_{13} = \frac{ST^3}{(1+ST)^3}\delta_{\mathrm{I}} + \frac{1+3ST+3S^2T^2}{(1+ST)^3}\delta_{\mathrm{p}} \quad (41)$$

From the above relations it can be seen that no error results in the computed acceleration, $Z_{17}$, computed velocity, $Z_{15}$, or computed position, $Z_{13}$, from steady state error in the sensed acceleration, $\ddot{Z}_{\mathrm{I}}$. The contribution of high frequency errors in the sensed position $Z_{\mathrm{p}}$, to the computed acceleration $Z_{17}$, and computed velocity $Z_{15}$, is limited. This is by contrast with obtaining such data by direct differentiation from the sensed position. Again, the contribution of the high frequency errors in the sensed position $Z_{\mathrm{p}}$, to the computed position $Z_{13}$, is attenuated at 6 db per octave as the frequency increases.

In automatic control systems, it is often desired to have a composite signal of position and velocity. Such a composite may be obtained as shown in FIGURE 5, again with no error in the output caused by steady state errors in the sensed acceleration. Through a mathematical development similar to that previously used, it can be shown that:

$$\ddot{Z}_{\mathrm{I}} = S^2 Z + \delta_{\mathrm{I}} \quad (17)$$

$$Z_{\mathrm{p}} = Z + \delta_{\mathrm{p}} \quad (18)$$

$$Z_{23} = (1+KS)Z + \left[\frac{ST^3}{(1+ST)^3} + K\frac{ST^2}{(1+ST)^2}\right]\delta_{\mathrm{I}} +$$
$$\left[\frac{1+3ST+3S^2T^2}{(1+ST)^3} + K\left(\frac{S^2T}{(1+ST)^2} + \frac{S}{1+ST}\right)\right]\delta_{\mathrm{p}} =$$
$$(1+KS)Z + \delta_{23} \quad (42)$$

$$\delta_{23} = \left[\frac{ST^3}{(1+ST)^3} + K + \frac{ST^2}{(1+ST)^2}\right]\delta_{\mathrm{I}} +$$
$$\left[\frac{1+3ST+3S^2T^2}{(1+ST)^3} + K\left(\frac{S^2T}{(1+ST)^2} + \frac{S}{1+ST}\right)\right]\delta_{\mathrm{p}}$$

It will be apparent that $Z_{23}$ of Equation (42) is related to $Z_{13}$ of Equation (40) and $Z_{15}$ of Equation (38) as follows:

$$Z_{23} = Z_{13} + KZ_{15} \quad (44)$$

Hence the discussion of Equations (38) and (40) applies to Equation (42).

Figure 5:
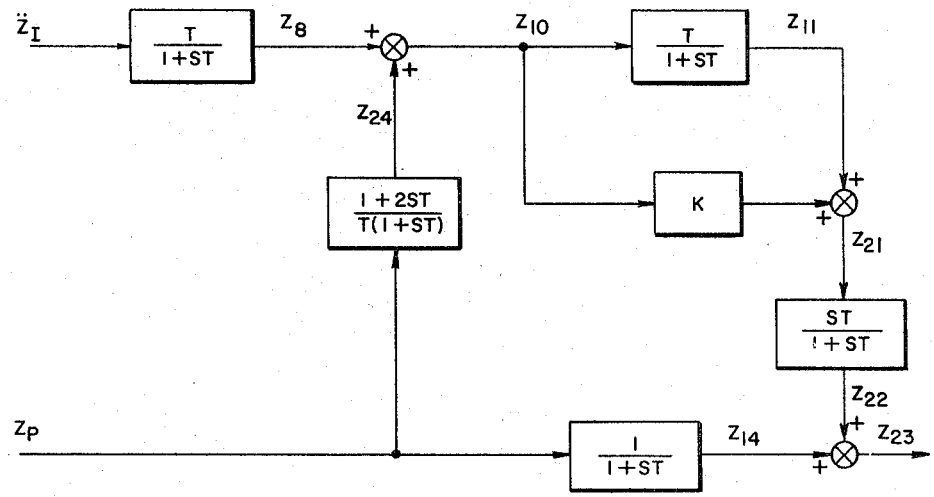

For the particular case in which the desired output is the displacement plus a gain factor times the first derivative of the displacement, a computer in accordance with FIGURE 5 is much simpler than is one based upon FIGURE 4 in which $Z_{15}$ and $Z_{13}$ are combined in the desired manner.

All of the preceding discussion used the terminology of sensed vertical position for $Z_{\mathrm{p}}$ and of sensed vertical acceleration for $\ddot{Z}_{\mathrm{I}}$. From these sensed quantities, computed quantities were obtained for the vertical position, $Z$, and its second derivative $S^2Z$, the vertical acceleration. Each of these computed quantities contained errors reduced from those in the sensed quantities. At the same time, the first derivative, $SZ$, or vertical velocity, was obtained which had less error than either integrated acceleration or differentiated position. Identically these same principles can be used for any two measurable quantities in which the one has essentially the dynamic characteristics of the second derivative of the other. Two other cases of common interest are angular position and acceleration, and horizontal position and acceleration.

Should one of the two measurable quantities $\dot{Z}_{\mathrm{v}}$, have essentially the dynamic characteristics of the first derivative of the other $Z_{\mathrm{p}}$, a computer as shown in FIGURES 6, 7, 8 or 9 may be used, depending upon the requirements and upon the desired mechanization.

Mathematical developments similar to those previously used, can yield the relationships for the computed quantities in FIGURES 6, 7, 8 and 9. The following definitions are used:

$$\dot{Z}_{\mathrm{v}} = SZ + \delta_{\mathrm{v}} \quad (45)$$

$$Z_{\mathrm{p}} = Z + \delta_{\mathrm{p}} \quad (18)$$

Figure 6:
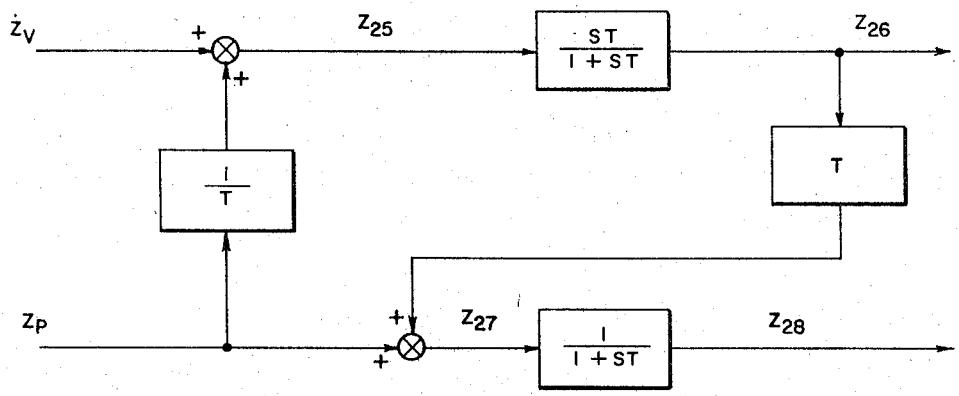

For FIGURE 6 it can be shown that:

$$Z_{26} = SZ + ST/(1+ST)\delta_{\mathrm{v}} + S/(1+ST)\delta_{\mathrm{p}} = SZ + \delta_{26} \quad (46)$$

$$\delta_{26} = ST/(1+ST)\delta_{\mathrm{v}} + S/(1+ST)\delta_{\mathrm{p}} \quad (47)$$

$$Z_{28} = Z + ST^2/(1+ST)^2\delta_{\mathrm{v}}$$
$$+ (1+2ST/(1+ST)^2\delta_{\mathrm{p}} = Z + \delta_{28} \quad (48)$$

$$\delta_{28} = ST^2/(1+ST)^2\delta_{\mathrm{v}} + (1+2ST)/(1+ST)^2\delta_{\mathrm{p}} \quad (49)$$

Figure 7:
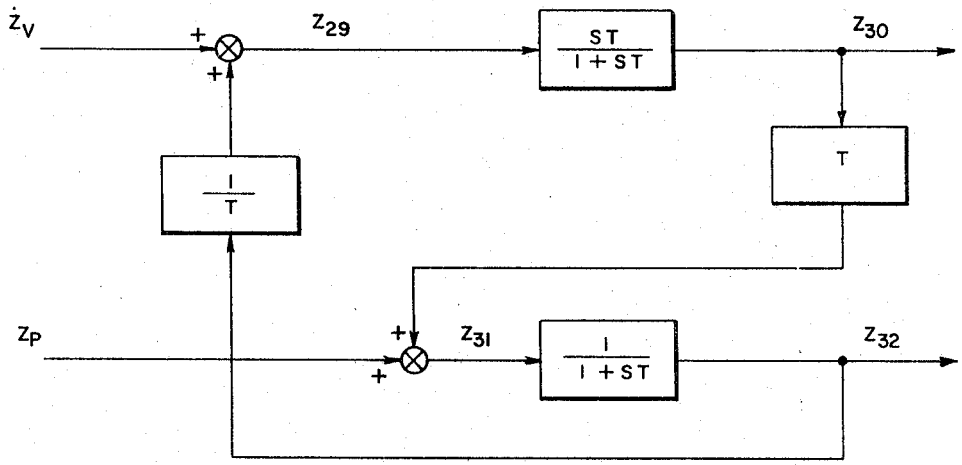

For FIGURE 7 it can be shown that:

$$Z_{30} = SZ + ST(1+ST)/(1+ST+S^2T^2)\delta_{\mathrm{v}}$$
$$+ S/(1+ST+S^2T^2)\delta_{\mathrm{p}} = SZ + \delta_{30} \quad (50)$$

$$\delta_{30} = ST(1+ST)/(1+ST+S^2T^2)\delta_{\mathrm{v}}$$
$$+ S/(1+ST+S^2T^2)\delta_{\mathrm{p}} \quad (51)$$

$$Z_{32} = Z + ST^2/(1+ST+S^2T^2)\delta_{\mathrm{v}}$$
$$+ (1+ST)/(1+ST+S^2T^2)\delta_{\mathrm{p}} = Z + \delta_{32} \quad (52)$$

$$\delta_{32} = ST^2/(1+ST+S^2T^2)\delta_{\mathrm{v}}$$
$$+ (1+ST)/(1+ST+S^2T^2)\delta_{\mathrm{p}} \quad (53)$$

Figure 8:
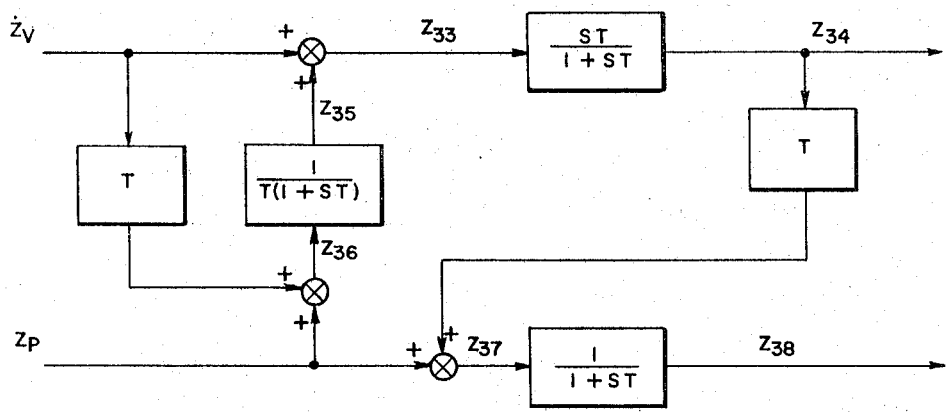

For FIGURE 8 it can be shown that:

$$Z_{34} = SZ + (ST(2+ST))/(1+ST)^2\delta_{\mathrm{v}}$$
$$+ S/(1+ST)^2\delta_{\mathrm{p}} = SZ + \delta_{34} \quad (54)$$

$$\delta_{34} = (ST(2+ST))/(1+ST)^2\delta_{\mathrm{v}} + S/(1+ST)^2\delta_{\mathrm{p}} \quad (55)$$

$$Z_{38} = Z + (ST^2(2+ST))/(1+ST)^3\delta_{\mathrm{v}}$$
$$+ (1+3ST+S^2T^2)/(1+ST)^3\delta_{\mathrm{p}} = Z + \delta_{38} \quad (56)$$

$$\delta_{38} = (ST^2(2+ST))/(1+ST)^3\delta_{\mathrm{v}}$$
$$+ ((1+3ST+S^2T^2)/(1+ST)^3)\delta_{\mathrm{p}} \quad (57)$$

Figure 9:
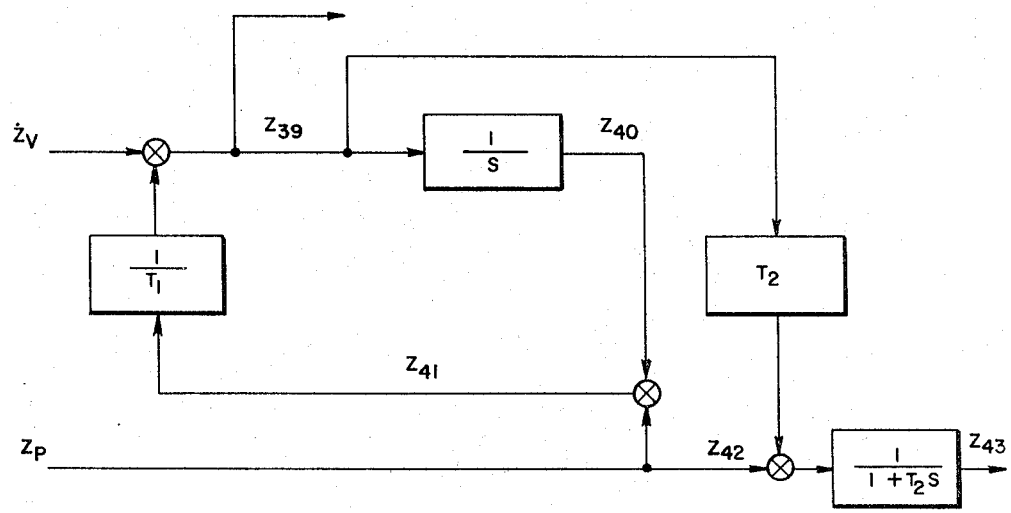
FIGURE 9 is an arrangement of the system one derivative removed from the arrangement of FIGURE 1 but using lead and lag devices.

For FIGURE 9 it can be shown that:

$$Z_{39} = SZ + ST_1/(1+ST_1)\delta_{\mathrm{v}}$$
$$+ S/(1+ST_1)\delta_{\mathrm{p}} = SZ + \delta_{39} \quad (58)$$

$$\delta_{39} = ST_1/(1+ST_1)\delta_{\mathrm{v}} + S/(1+ST_1)\delta_{\mathrm{p}} \quad (59)$$

$$Z_{43} = Z = \frac{ST_1 T_2}{(1+ST_1)(1+ST_2)}\delta v$$
$$+ \frac{1+S(T_1+T_2)}{(1+ST_1)(1+ST_2)}\delta_{\mathrm{p}} = Z + \delta_{43} \quad (60)$$

$$\delta_{43} = \frac{ST_1 T_2}{(1+ST_1)(1+ST_2)}\delta v + \frac{1+S(T_1+T_2)}{(1+ST_1)(1+ST_2)}\delta_{\mathrm{p}} \quad (61)$$

It will be noted that between FIGURES 6 and 9, the following relationships exist for the particular case that $T_1 = T_2 = T$.

$$Z_{26} = Z_{39}$$
$$\delta_{26} = \delta_{39}$$
$$Z_{28} = Z_{43} \quad (62)$$
$$\delta_{28} = \delta_{43}$$

Hence the two computers are functionally identical, differing only in the configurations. Mechanization considerations would determine which configuration would be selected for a particular application.

For the computed velocity ($Z_{26}$, $Z_{30}$, $Z_{34}$, or $Z_{39}$) in each of FIGURES 6, 7, 8 or 9, there is no error resulting from steady-state errors in either sensed quantity. The configurations of FIGURES 7 and 8 provide superior attenuation of the high frequency constituents of the error, $\delta_{\mathrm{p}}$. The configuration of FIGURE 7 has a transient response to the errors $\delta_{\mathrm{v}}$ and $\delta_{\mathrm{p}}$ that is less than critically damped (damping ratio=0.5).

For the computed position ($Z_{28}$, $Z_{32}$, $Z_{38}$, $Z_{43}$) in each of FIGURES 6, 7, 8 and 9, there is no error resulting from steady-state error, $\delta_{\mathrm{v}}$, in $\dot{Z}_{\mathrm{v}}$. The preceding comparisons of the response to high frequency errors among FIGURES 5, 6, 8 and 9 apply also to the computed position. Similarly there is a damping ratio of 0.5, for the configuration of FIGURE 6, in its response to errors $\delta_v$ and $\delta_p$.

Each of the configurations of FIGURES 6, 7, 8 and 9 can yield smaller errors in the computed quantities at low and/or high frequencies than direct use of the measured quantities, or direct differentiation or integration thereof.

It will be apparent to those skilled in the art that extension of the principles described herein can satisfy requirements of other particular cases than have been used to illustrate the principles.

It will now be apparent that I have provided a novel arrangement for providing a measurement of true vertical acceleration and vertical velocity by inertial means through a closed loop mechanization that constrains the velocity error through a computation scheme to bound the velocity error by using some information from a vertical position sensor or the pressure depth sensor whereby the arrangement also automatically extracts true acceleration involving vertical movement of the craft involved from the total accelerometer signal of the craft. This computation arrangement for effecting the blending scheme of vertical acceleration and vertical velocity involves inclusion of two high quality integrators which blend pressure depth datum with the accelerometer signal indication to provide the true vertical acceleration and absolute velocity with a bounded error.

Further, while all of the preceding discussion used the terminology of sensed vertical position for $Z_p$ and for sensed vertical acceleration for $\ddot{Z}_1$ and from these sensed quantities, computed quantities were obtained for the vertical position Z, and its second derivative $S^2Z$, the vertical acceleration. These same principles can be used for any two measurable quantities in which the one has essentially the dynamic characteristics of the second derivative of the other. For example the displacement signal could be temperature and the second derivative could be rate of change of temperature or the second time derivative of the temperature.

What I claim is:

1. In control apparatus, first sensing means providing a signal in accordance with a sensed acceleration, second sensing means comprising a position sensor providing a signal in accordance with sensed displacement from datum, computer means jointly controlled by said first two signals providing a true velocity signal, and means controlled by said sensed displacement signal and said correct velocity signal providing a corrected displacement signal.

2. In control apparatus, means for providing a first sensed variable signal, means providing a second sensed signal which is a second time derivative of the variable signal means combining the said two signals, and means jointly controlled by said combined signals and the variable signal for obtaining a resultant signal, and a lag device controlled by said resultant signal and having an output in accordance with the variable but excluding steady state components in said derivative signal.

3. In control apparatus, acceleration responsive means providing a signal in accordance with a sensed acceleration, second means comprising a position sensor responsive to displacement from a datum providing a signal in accordance with sensed displacement, means jointly controlled by said first two signals providing a true acceleration signal, and means controlled by said sensed displacement signal and said correct acceleration signal providing a corrected displacement signal.

4. In control apparatus, sensing means providing a first signal in accordance with a sensed variable quantity second sensing means providing a signal in accordance with a second sensed variable quantity, said first sensed variable being a second time derivative of the second sensed variable, computer means jointly controlled by said first two sensed signals providing a true first time derivative of the second signal, and means controlled by said sensed second signal and said correct first time derivative signal providing a corrected second signal.

5. In control apparatus, means providing a first sensed signal in accordance with a variable, said signal being a composite of said second time derivative and an error, means providing a second sensed signal in accordance with a second time derivative of the first signal, filter means jointly controlled by said first two signals providing a true second time derivative signal, and means controlled by said first sensed variable signal and said true second time derivative signal providing a corrected first variable signal.

6. In control apparatus, means providing a first signal in accordance with a sensed variable, second means providing a second signal in accordance with a sensed variable that is a second time derivative of the first variable, filter means jointly controlled by said first two signals providing a true signal which is a first time derivative of the variable, and means including filters controlled by the first sensed variable signal and the true first time derivative of the variable providing a corrected first time derivative signal.

7. In contol apparatus, first sensing means for providing a first sensed variable signal, second sensing means providing a second sensed signal which is the second time derivative of the first variable signal, a gain device receiving said first sensed signal and supplying a third signal, means combining the second and third signals, and means jointly controlled by said combined signals and the first signal for obtaining a resultant signal, and a lag device controlled by said resultant signal and having an output in accordance with the resultant signal.

8. Apparatus for computing the displacement vertically of an object from a datum, comprising: first signal means sensing the displacement of the object from datum; second signal means sensing a derivative of the displacement of the object from datum; and computer means responsive to the two sensing means for providing a computed signal proportional to the displacement from datum having as components: the true displacement of the object from datum, plus a first quantity in accordance with the error or noise component, $\delta_I$, in the sensed derivative of the displacement signal from the second means modified by a factor varying as the fraction $1/(1+s+s^2)$, plus a second quantity in accordance with the error or noise component, $\delta_p$, in the sense displacement signal from the first means modified by a factor varying as the fraction $(1+s)/(1+s+s^2)$.

9. Apparatus for computing the displacement vertically of an object from a datum, comprising: first signal means sensing the displacement of the object from datum; second signal means sensing a derivative of the displacement of the object from datum; and computer means responsive to the two sensing means for providing a computed signal proportional to the displacement from datum having as components: the true displacement of the object from datum, plus a first quantity having a magnitude in accordance with the error or noise component, $\delta_I$, in the sensed derivative of the displacement signal from the second means modified by the factor varying as the fraction $1/(1+s)^N$, where N is a whole number, plus a second quantity having a magnitude in accordance with the error or noise component, $\delta_p$, in the sensed displacement signal from first means modified by a factor varying as the fraction $(1+s)/(1+s)^N$, where N is a whole number.

10. In control apparatus in combination: means providing a first signal $Z_p$ in accordance with a sensed displacement from a datum; means providing a second sensed signal $\ddot{Z}_I$ varying with indicated acceleration; means combining said signals including first gain means modifying the first signal; a first motor operated integrator responsive to said combined signals; means providing an additional signal in accordance with said sensed displacement including further second gain means modifying the first signal; second combining means responsive to the additional signal and an output signal from the first integrator; a second motor operated integrator responsive to the second combining means; means supplying the output of said second integrator which output includes true displacement to a third combining means intermediate the first gain means and said first signal providing means in opposition to said first signal to obtain from the first combining means a corrected acceleration signal.

11. Apparatus of claim 10, wherein the additional signal to the input of the second combining means is supplied from the third combining means through the second gain means whereby the said second combining means provides a signal in accordance with the correct velocity.

12. The apparatus of claim 11 and a first utilization means operated by said velocity signal and a second utilization means operated by said corrected acceleration signal.

13. In control apparatus for a dirigible craft whereby the craft may be controlled, in combination: means providing a first sensed signal $Z_p$ in accordance with the craft vertical displacement from a datum; additional means modifying or varying said signal in accordance with the gain factor $1/T_2^2$; means supplying a second sensed signal in accordance with craft vertical acceleration $\ddot{Z}_I$; combining means responsive to said two signals; a first motor operated integrator responsive to said combining means; further means providing an additional signal in accordance with vertical displacement signal $Z_p$ modified by a gain factor $1/T_1$; a second combining means responsive to the additional signal and an output from the first integrator; a second motor operated integrator responsive to the output of the second combining means; means supplying the output of the second integrator which includes true vertical displacement to a third combining means operationally between the first signal providing means and said additional means thereby obtaining from the first combining means a corrected or blended acceleration signal, wherein the gain factors $1/T_1$ and $1/T_2$ are chosen to achieve the desired relationship between errors, or noise, in the sensed quantities and in the output quantities.

14. The apparatus of claim 13; wherein the third combining means operationally is between the first signal providing means and said additional means and further means for modifying the output of the third combining means by the factor of $1/T_1$ and applying it to the second combining means, whereby the second combining means supplys a signal in accordance with the vertical velocity of the dirigible craft.

15. In control apparatus whereby a dirigible craft may be controlled, in combination: means providing a signal voltage in accordance with a sensed vertical displacement $Z_p$ of the craft from a datum; means providing a signal voltage varying with indicated or sensed vertical acceleration $\ddot{Z}_I$, said acceleration signal including gravity and accelerations perturbations; first means modifying and combining said voltage signals; a first integrator comprising an electrical motor responsive to said combined voltage signals; means providing an additional voltage signal in accordance with a modification of said vertical displacement signal; a second combining means responsive to said additional voltage signal and an output voltage signal derived from operation of said first integrator motor; a second integrator motor responsive to said second combining means; means supplying an output voltage due to operation of said second integrator motor to said first modifying and combining means said output voltage opposing or being of opposite sign to said vertical acceleration voltage signal to said first modifying and combining means whereby to obtain from the output of said first modifying and combining means a corrected vertical acceleration voltage signal.

16. The apparatus of claim 15, and means for applying to the input of said second combining means a signal voltage varying with the time integration of the operation of said second integrator motor whereby said second combining means supplies a voltage signal in accordance with the vertical velocity of the craft.

17. The apparatus of claim 6, and means modifying the output of said second combining means in accordance with a device having a transfer function $T_3$, fourth summing or combining means responsive to said sensed displacement signal and said modified velocity signal, and supplying its output to a device having a transfer function $1/(1+T_3S)$ whereby to provide a displacement output free of a steady-state error in the acceleration signal, wherein $T_3$ is a gain factor chosen to achieve a desired relationship between input and output quantities.

18. Means providing a sensed first signal in accordance with acceleration, means applying said acceleration signal to a device having a transfer function $T/(1+ST)$ to provide a second signal, means supplying a sensed second signal, in accordance with displacement, means modifying said displacement signal by a device having the transfer function $S/(1+ST)$ to provide a fourth signal, means combining said second and fourth signals and providing a fifth signal, means supplying a sixth signal in accordance with the displacement signal modified by a device having the transfer function $1/T$, means combining said fifth and sixth signals and providing a seventh signal, means modifying said seventh signal in accordance with a transfer function $T/(1+ST)$ whereby the output from the latter device is a corrected displacement signal.

19. Means for providing a first sensed displacement signal $Z_p$, first combining means responsive to said first displacement signal and a second displacement signal in accordance with the craft true position $Z_4$, means transmitting the output $Z_5$ of said first combining means to a first gain device having a transfer function $1/T_2^2$ to provide an output $Z_7$ therefrom, means providing an acceleration signal $\ddot{Z}_I$, second combining means responsive to said acceleration signal $\ddot{Z}_I$ and $Z_7$ in opposing relation and providing a true acceleration signal $Z_1$, a first integrator having the transfer function $1/S$ responsive to signal $Z_1$ and computing an output $Z_2$, means modifying signal $Z_5$ in accordance with the transfer function $1/T_1$ to provide a signal $Z_6$, third combining means combining $Z_2$ and $Z_6$ in opposing relation and providing an output $Z_3$ corresponding with true velocity, a second integrator having the transfer function $1/S$ responsive to $Z_3$ and computing a true position signal $Z_4$ having bounded error components, means supplying the signal $Z_4$ to said first combining means in opposition of $Z_p$, means modifying the signal $Z_3$ in accordance with gain quantity $T_3$, and fourth combining means summing $Z_p$ and $Z_3$ modified in reinforcing relation, and means supplying the output of said fourth combining means to a device having the transfer function $1/(1+T_3S)$ to provide an output $Z_0$ which is the corrected displacement excluding bounding errors.

20. In control apparatus whereby a dirigible craft may be controlled, in combination: means providing a signal voltage in accordance with a sensed vertical displacement $Z_p$ of the craft from a datum; means providing a signal voltage varying with indicated or sensed vertical acceleration $\ddot{Z}_I$, said acceleration signal including gravity and accelerations perturbations; first means modifying and combining said voltage signals; a first integrator responsive to said combined voltage signals; means providing an additional voltage signal in accordance with a modification of said vertical displacement signal; a second combining means responsive to said additional voltage signal and an output voltage signal derived from operation of said first integrator; a second integrator responsive to said second combining means; means supplying an output voltage due to operation of said second integrator to said first modifying and combining means said output voltage opposing or being of opposite sign to said vertical acceleration voltage signal to said first modifying and combining means whereby to obtain from the output of said first modifying and combining means a corrected vertical acceleration voltage signal.

References Cited by the Examiner

UNITED STATES PATENTS

| | | | |
|---|---|---|---|
| 2,829,322 | 4/1958 | Silva | 235—151 |
| 2,914,763 | 11/1959 | Greenwood et al. | |
| 2,934,267 | 4/1960 | Wirkler et al. | |
| 2,959,347 | 11/1960 | Kearns. | |
| 3,018,049 | 1/1962 | Green | 235—187 |
| 3,040,568 | 6/1962 | Markusen et al. | 73—178 |
| 3,077,557 | 2/1963 | Joline et al. | 235—187 |
| 3,126,474 | 3/1964 | Zweibel et al. | 235—151 |

FOREIGN PATENTS 803,722 10/1958 Great Britain.

MALCOLM A. MORRISON, *Primary Examiner.*

I. KESCHNER, C. L. WHITHAM, *Assistant Examiners.*